US011072070B2

United States Patent
Seno et al.

(10) Patent No.: US 11,072,070 B2
(45) Date of Patent: Jul. 27, 2021

(54) TRAJECTORY PLANNING APPARATUS, TRAJECTORY PLANNING METHOD, AND PRODUCTION SYSTEM

(71) Applicant: HITACHI, LTD., Tokyo (JP)

(72) Inventors: Takashi Seno, Tokyo (JP); Daisuke Tsutsumi, Tokyo (JP); Daiki Kajita, Tokyo (JP); Nobuaki Nakasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 425 days.

(21) Appl. No.: 16/166,255

(22) Filed: Oct. 22, 2018

(65) Prior Publication Data

US 2019/0275675 A1 Sep. 12, 2019

(30) Foreign Application Priority Data

Mar. 9, 2018 (JP) .............................. JP2018-042644

(51) Int. Cl.
*B25J 9/16* (2006.01)
*B25J 9/06* (2006.01)
*G05B 19/02* (2006.01)

(52) U.S. Cl.
CPC .............. *B25J 9/1664* (2013.01); *B25J 9/06* (2013.01); *B25J 9/1671* (2013.01); *G05B 19/02* (2013.01); *G05B 2219/40323* (2013.01); *G05B 2219/40519* (2013.01)

(58) Field of Classification Search
USPC .................................................. 700/245–264
See application file for complete search history.

(56) References Cited

U.S. PATENT DOCUMENTS

| 5,737,500 | A * | 4/1998 | Seraji | B25J 9/1643 318/568.11 |
| 6,004,016 | A * | 12/1999 | Spector | B25J 9/1666 700/247 |
| 6,408,224 | B1 * | 6/2002 | Okamoto | B25J 9/1661 29/721 |
| 8,838,273 | B2 * | 9/2014 | Hvass | G05D 1/0272 700/253 |
| 9,043,030 | B2 * | 5/2015 | Choi | B25J 9/1664 700/262 |
| 9,815,200 | B2 * | 11/2017 | Zimmermann | B25J 9/1664 |

(Continued)

FOREIGN PATENT DOCUMENTS

JP 2016-040066 A 3/2016

*Primary Examiner* — Jonathan L Sample
(74) *Attorney, Agent, or Firm* — Volpe Koenig

(57) ABSTRACT

A trajectory planning apparatus including a joint axis classification unit for classifying a plurality of joint axes of a robot into axis groups, according to joint axis classification information for classifying into the axis groups including at least a path search axis group, a path search unit for searching for a path of an angle of the joint axis classified into the path search axis group that minimizes an evaluation function for evaluating a planed trajectory, based on trajectory start point information representing a posture of the robot at a start point of the planed trajectory and trajectory endpoint information representing a posture of the robot at an end point of the planned trajectory, and an axis group angle calculation unit for calculating an angle of the joint axis classified into each axis group other than the path search axis group during the search of the path.

12 Claims, 11 Drawing Sheets

(56) References Cited

U.S. PATENT DOCUMENTS

| | | | | |
|---|---|---|---|---|
| 2004/0093119 | A1* | 5/2004 | Gunnarsson | B25J 9/1638 700/245 |
| 2004/0249509 | A1* | 12/2004 | Rogers | G05B 19/4103 700/245 |
| 2005/0113973 | A1* | 5/2005 | Endo | B25J 13/08 700/245 |
| 2006/0293790 | A1* | 12/2006 | Gienger | B25J 9/1643 700/245 |
| 2010/0168919 | A1* | 7/2010 | Okamoto | B25J 9/1643 700/275 |
| 2010/0312391 | A1* | 12/2010 | Choi | B25J 9/1656 700/254 |
| 2011/0106307 | A1* | 5/2011 | Kim | G05D 1/0214 700/246 |
| 2012/0239194 | A1* | 9/2012 | Kagawa | B25J 9/1692 700/254 |
| 2013/0013113 | A1* | 1/2013 | Choi | B25J 9/1664 700/262 |
| 2013/0184860 | A1* | 7/2013 | Ota | B25J 9/1669 700/245 |
| 2014/0052297 | A1* | 2/2014 | Mattern | B25J 9/1687 700/259 |
| 2016/0016308 | A1* | 1/2016 | Kanazawa | B25J 9/1607 700/263 |

* cited by examiner

JOINT AXIS CLASSIFICATION INFORMATION

| TYPE OF AXIS GROUP | AXIS NUMBER |
|---|---|
| PATH SEARCH AXIS | J1,J2,J3 |
| DIRECTION ADJUSTMENT AXIS | J4,J5,J6 |
| STOP AXIS | NO |
| LINEAR INTERPOLATION AXIS | NO |

EVALUATION FUNCTION INFORMATION

| TYPE OF EVALUATION FUNCTION | SELECTION |
|---|---|
| 1. MINIMIZATION OF CHANGE AMOUNT COST OF JOINT | ○ |
| 2. MINIMIZATION OF MOVING DISTANCE COST OF ARM TIP | |
| 3. MINIMIZATION OF OPERATING TIME COST | |
| 4. MINIMIZATION OF ACCELERATION COST + OPERATING TIME COST APPLIED TO ARM TIP | |
| 5. MINIMIZATION OF INVERSE NUMBER OF DISTANCE COST BETWEEN INTERFERENCE OBJECT AND ROBOT + CHANGE AMOUNT COST OF JOINT | |

| No | TIME | J1 | J2 | J3 | J4 | J5 | J6 |
|---|---|---|---|---|---|---|---|
| 0 | 0:00s | 10.0° | 90.0° | 10.0° | 180.0° | -100.0° | 190.0° |
| 1 | 0:01s | 15.0° | 90.0° | 15.0° | 180.0° | -110.0° | 200.0° |
| ⋮ | | | | | | | |
| 10 | 0:10s | 170.0° | 100.0° | -20.0° | 185.0° | -85.0° | 180.0° |

TRAJECTORY INFORMATION 701

FIG. 12

| WORK CONTENT INFORMATION | 1221 |
|---|---|
| PROCESS NUMBER | WORK CONTENT |
| 1 | TIGHTENING OF SCREW A |
| 2 | PICKING AND PLACING OF COMPONENT C |
| 3 | TIGHTENING OF SCREW B |
| ⋮ | |

TRAJECTORY PLANNING APPARATUS, TRAJECTORY PLANNING METHOD, AND PRODUCTION SYSTEM

TECHNICAL FIELD

The present invention relates to a trajectory planning apparatus, a trajectory planning method, and a production system.

BACKGROUND ART

As a method of planning a trajectory (path) when moving an arm of a multi-axis robot from a first teaching point to a second teaching point, for example, PTL 1 discloses a method where a start point and an end point are obtained as parameter values of respective joints J1, J2, J3, J4, J5 and J6 of the robot, joint interpolation paths (a plurality of constraint points) are obtained to constrain paths of the joints that operate between the start point and the end point for the joints J4, J5 and J6 belonging to one group among the joints of the robot divided into two groups, and a configuration space having positions of the joints J1, J2 and J3 belonging to the other group among the two groups, as coordinate axes, is constructed, and it is determined whether or not the robot interferes with an obstacle, for points combining interest points and the plurality of constraint points in the configuration space, and a path for avoiding the robot interfering with the obstacle is searched.

CITATION LIST

Patent Literature

PTL 1: JP-A-2016-40066

SUMMARY OF INVENTION

Technical Problem

In the method described in PTL 1, a part (a plurality of constraint points) of joint paths belonging to one of two groups is determined in advance, so that the possible posture of the robot is limited.

For example, it is assumed that, in a 6-axis robot equipped with joints J1 to J6, the joints J1 to J3 are obtained by searching the configuration space, and the joints J4 to J6 are obtained by a joint interpolation path constraining a joint path, and a direction where a tip of a robot arm may take is limited. In this case, since values of the joints J4 to J6 are obtained without referring to the angles of the joints J1 to J3, the direction of the tip of the robot arm may not be assumed, and it is impossible to contribute to a restriction on the direction of the tip of the robot arm.

Further, in searching only the joints J1 to J3, interference (contact with an object) may be avoided and a trajectory from a first teaching point to a second teaching point may not be planned while satisfying the restriction on the direction of the tip of the robot arm.

The invention has been made keeping in mind the above problems occurring in the related art, and an object of the invention is to plan a trajectory from a first teaching point to a second teaching point while satisfying various restrictions such as a restriction on a direction of a tip of a robot arm.

Solution to Problem

The present application includes a plurality of means for solving at least apart of the above-mentioned object, and an example of the means is as follows. In order to solve the above problem, a trajectory planning apparatus according to a first aspect of this invention includes a joint axis classification unit for classifying a plurality of joint axes of a robot into a plurality of different axis groups, according to joint axis classification information for classifying into a plurality of different axis groups including at least a path search axis group; a path search unit for searching for a path of an angle of the joint axis classified into the path search axis group that minimizes an evaluation function for evaluating a planed trajectory, based on trajectory start point information representing a posture of the robot at a start point of the planed trajectory and trajectory end point information representing a posture of the robot at an end point of the planned trajectory; and an axis group angle calculation unit for calculating an angle of the joint axis classified into each axis group other than the path search axis group during the search of the path by the path search unit.

Advantageous Effects of Invention

According to the invention, it is possible to plan a trajectory from a first teaching point to a second teaching point while satisfying various restrictions such as a restriction on a direction of a tip of a robot arm.

The problems, configurations, and effects other than those described above will be clarified from the description of the following embodiments.

BRIEF DESCRIPTION OF DRAWINGS

FIG. 2 is a diagram illustrating an example of joint axis classification information.

FIG. 3 is a diagram illustrating an example of evaluation function information.

FIG. 12 is a flowchart illustrating an example of feedback control processing.

DESCRIPTION OF EMBODIMENTS

Figure 1:
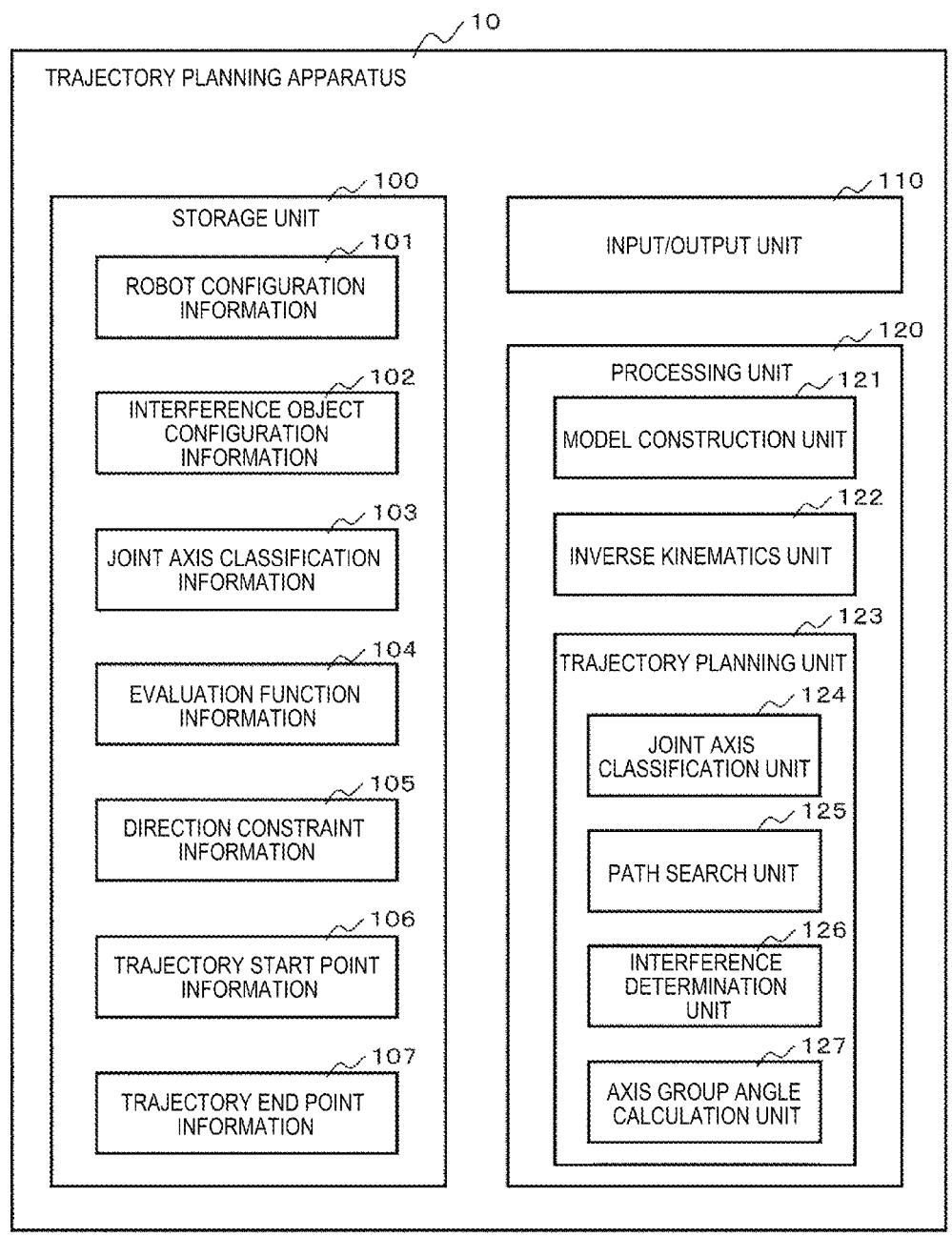
FIG. 1 is a diagram illustrating a configuration example of a trajectory planning apparatus according to a first embodiment of the invention.

Hereinafter, several embodiments of the invention will be described with reference to the drawings. In all the drawings for explaining the embodiments, the same components will be denoted by the same reference numerals in principle, and a duplicated description thereof will be omitted. Further, in the following embodiments, components (elements, steps and others) are obviously indispensable except for the case where it is explicitly stated and the case where it is considered to be obviously indispensable in principle. Furthermore, when referring to "comprising A", "consisting of A", "having A" and "including A", it goes without saying that it does not exclude other elements unless otherwise specified. Similarly, in the following embodiments, when referring to the shapes, positional relationships and others of components, substantially similar shapes may likewise be included except for the case where it is explicitly stated and the case where it is considered to be obviously indispensable in principle.

<Configuration Example of Trajectory Planning Apparatus According to First Embodiment of the Invention>

FIG. 1 illustrates the configuration example of the trajectory planning apparatus according to the first embodiment of the invention.

The trajectory planning apparatus 10 includes a storage unit 100, an input/output unit 110, and a processing unit 120.

The storage unit 100 stores robot configuration information 101, interference object configuration information 102, joint axis classification information 103, evaluation function information 104, direction constraint information 105, trajectory start point information 106, and trajectory end point information 107.

The robot configuration information 101 is previously input by a user and includes, for example, joint position information representing the position of each joint axis provided in a robot, initial angle information of each joint axis, movable range information of each joint axis, type information of the joint axis, robot three-dimensional model data information showing the shape of the robot and the like. The robot configuration information 101 may be used to construct a robot model in motion simulation of the robot.

The interference object configuration information 102 is previously input by the user and includes, for example, installation coordinate information of an interference object that may be brought into contact when a robot arm moves, and interference object three-dimensional model data information showing the shape of the interference object. The interference object configuration information 102 is used to construct an interference object model in the motion simulation of the robot.

The joint axis classification information 103 is information indicating into which axis group of a plurality of axis groups a plurality of joint axes of the robot is classified. It should be noted that the user may previously input the joint axis classification information 103. Unless the user inputs the information, a joint axis classification unit 124 of the processing unit 120 classifies the plurality of joint axes of the robot into the plurality of axis groups, and generates the joint axis classification information 103 based on the classification result.

FIG. 2 shows an example of the joint axis classification information 103. In the present embodiment, six joint axes J1 to J6 of the robot may be classified into one of four types of axis groups (path search axis, direction adjustment axis, stop axis, and linear interpolation axis). In FIG. 2, the joint axes J1 to J3 are classified into path search axes and the joint axes J4 to J6 are classified into direction adjustment axes. The number of joint axes of the robot is not limited to six. Further, as long as the number of axis groups into which the joint axes are classified is two or more including the path search axis, the number is not limited to the above-described example.

Turning back to FIG. 1, the evaluation function information 104 is information indicating which one of the plurality of evaluation functions is selected as the evaluation index of the trajectory planning, and may be previously input by the user.

FIG. 3 illustrates an example of the evaluation function information 104. In FIG. 3, five types of evaluation functions are prepared in advance, and a state in which the first evaluation function "minimization of the change amount cost of the joint" is selected by the user is shown.

For example, as illustrated in FIG. 3, when the first evaluation function "minimization of the change amount cost of the joint" is selected, the trajectory is planned such that the total change amounts of the plurality of joint axes are minimized. Further, for example, when the second evaluation function "minimization of the moving distance cost of the arm tip" is selected, the trajectory is planned such that the total moving distances of the robot arm tips are minimized. Furthermore, for example, when the third evaluation function "minimization of operating time cost" is selected, the trajectory is planned such that the operating time of the robot is shortest. For example, when the fourth evaluation function "minimization of acceleration cost+operating cost applied to the arm tip" is selected, the trajectory is planned to adopt an optimum value by adding the acceleration cost and the operating cost applied to the robot arm tip. Further, for example, when the fifth evaluation function "minimization of the inverse number of distance cost between the interference object and the robot+indirect change amount cost" is selected, the trajectory is planned to adopt an optimum value that increases the distance between the interference object and the robot while reducing the total change amount of the joints.

The user may simultaneously select a plurality of evaluation functions. Thus, in this case, the trajectory that minimizes the weighted sum of the selected plural evaluation functions is planned. Further, in this case, the user may be able to set the weighting coefficients of the plurality of evaluation functions. Further, the evaluation function is not limited to the example shown in FIG. 3, and other evaluation functions may be adopted.

Turning back to FIG. 1, the direction constraint information 105 is information that constrains the direction of the arm tip in the trajectory of the robot arm, and is previously input by the user.

Figure 4:
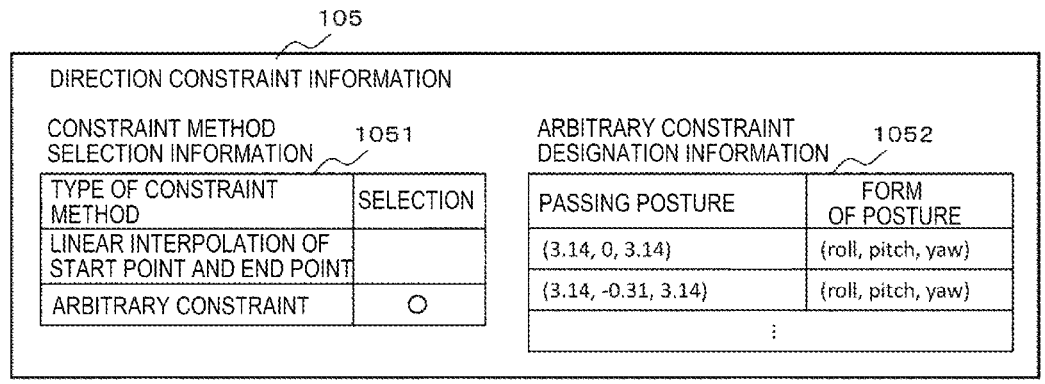
FIG. 4 is a diagram illustrating an example of direction constraint information.

FIG. 4 shows an example of the direction constraint information 105. The direction constraint information 105 includes constraint method selection information 1051 and arbitrary constraint designation information 1052.

The constraint method selection information 1051 is information representing the method of constraining the direction of the tip of the robot arm, and may be input in advance by the user. It should be noted that the direction constraint information 105 may not be input.

The constraint method selection information 1051 may select either of "linear interpolation of the start point and the end point" or "arbitrary constraint". The arbitrary constraint designation information 1052 is information, when the "arbitrary constraint" is selected in the constraint method selection information 1051, added to the direction constraint information 105, and may set arbitrary constraint conditions to the direction of the tip of the robot arm in a chronological order.

When the direction constraint information 105 is input, at least one joint axis is classified as the direction adjustment axis group by the joint axis classification unit 124 that will be described later. Further, when the direction constraint information 105 is input, the axis group angle calculation unit 127 that will be described later determines the joint angle of the joint axis classified as the direction adjustment axis satisfying the direction constraint information 105. Further, when "the linear interpolation of the start point and the end point" is selected in the constraint method selection information 1051 of the direction constraint information 105, the axis group angle calculation unit 127 determines the joint angle of the joint axis classified as the direction adjustment axis during the trajectory plan so that the direction at the trajectory start point and the direction at the trajectory end point are linearly interpolated.

Turning back to FIG. 1, the trajectory start point information 106 is information that designates the posture of the robot in the start point of the trajectory, and is previously input by the user. As the information designating the posture of the robot, for example, the angle of each joint of the robot, the position coordinates of the tip of the robot arm, and the direction vector information (roll, pitch, yaw, Euler angle, etc.) of the tip of the robot arm may be used.

The trajectory end point information 107 is information that designates the posture of the robot in the endpoint of the trajectory, and is previously input by the user. Similarly to the trajectory start point information 106, as the information designating the posture of the robot, for example, the angle of each joint of the robot, the position coordinates of the tip of the robot arm, and the direction vector information of the tip of the robot arm may be used.

The input/output unit 110 (corresponding to the output unit of the invention) is composed of an input/output interface that is connected to an input device receiving an input from the user and outputs trajectory information 701 (FIG. 5) showing the planned trajectory to an external device or the like.

The processing unit 120 includes a model construction unit 121, an inverse kinematics unit 122, and a trajectory planning unit 123.

The model construction unit 121 constructs the robot model based on the robot configuration information 101 of the storage unit 100. Further, the model construction unit 121 constructs an interference object model depending on the interference object configuration information 102 of the storage unit 100 and outputs it to the inverse kinematics unit 122.

The robot model constructed by the model construction unit 121 includes, for example, information about the shape of the robot, the angle of the joint, the type of the joint, the position and direction of the robot arm tip. Depending on a change in the robot configuration information 101, the shape of the robot, the position and direction of the robot arm tip and the like are changed.

The interference object model constructed by the model construction unit 121 includes information required for calculating the interference between the robot model and the interference object model, such as the position or shape of the interference object.

The inverse kinematics unit 122 receives the robot model and the interference object model constructed by the model construction unit 121 and the trajectory start point information 106 and the trajectory endpoint information 107 of the storage unit 100 as input, converts the data format of the trajectory start point information 106 and the trajectory end point information 107 into a data format that may be processed by the trajectory planning unit 123, and then outputs it to the trajectory planning unit 123.

Specifically, the inverse kinematics unit 122 converts the position and direction of the robot arm tip as the trajectory start point information 106 and the trajectory end point information 107 into the angle of each joint axis. Meanwhile, if the data format of the trajectory start point information 106 and the trajectory end point information 107 of the storage unit 100 is the angle of each joint axis, the inverse kinematics unit 122 outputs it to the trajectory planning unit 123 while omitting conversion.

By providing the inverse kinematics unit 122, the user may easily input the position and direction of the robot arm tip, which are easier to input as compared to the angle of each joint axis, as the trajectory start point information 106 and the trajectory end point information 107.

The trajectory planning unit 123 receives the trajectory start point information 106 and the trajectory end point information 107 as an input after the conversion of the data format, generates a trajectory connecting the start point and the end point of the trajectory, and outputs it to the input/output unit 110 as the trajectory information 701.

The trajectory planning unit 123 includes a joint axis classification unit 124, a path search unit 125, an interference determination unit 126, and an axis group angle calculation unit 127.

When the joint axis classification information 103 exists in the storage unit 100 (when the joint axis classification information 103 has been previously input by the user), the joint axis classification unit 124 classifies the plurality of joint axes of the robot into a plurality of different axis groups according to the joint axis classification information 103.

Further, when the joint axis classification information 103 is not present in the storage unit 100 (when the joint axis classification information 103 has not been previously input by the user), the joint axis classification unit 124 divides the joint axis to plan the trajectory that minimizes the evaluation function selected in the evaluation function information 104. Specifically, the joint axis classification unit 124 previously holds a table in which the evaluation function and the classification pattern of the plurality of joint axes are associated with each other, refers to the table, adopts a classification pattern corresponding to the evaluation function selected by the evaluation function information 104, and classifies the plurality of joint axes of the robot into a plurality of different axis groups.

The path search unit 125 uses a configuration space whose joint angle of each joint axis classified as the path search axis group (hereinafter simply referred to as the path search axis) is the axis, and searches a path where cost corresponding to the selected evaluation function is the smallest.

The interference determination unit 126 determines the interference (contact) between the robot model and the interference object model in the path searched by the path search unit 125.

The axis group angle calculation unit 127 determines the angle of each joint axis classified into each axis group. For example, the axis group angle calculation unit 127 determines the angle of the joint axis classified as the stop axis group, as an angle in the motion start point, and determines the angle of the joint axis classified as the linear interpolation axis group by the linear interpolation of the angle of the motion start point and the angle of the motion end point.

<Example of Flow of Processing and Input and Output of Information by Trajectory Planning Apparatus 10>

Figure 5:
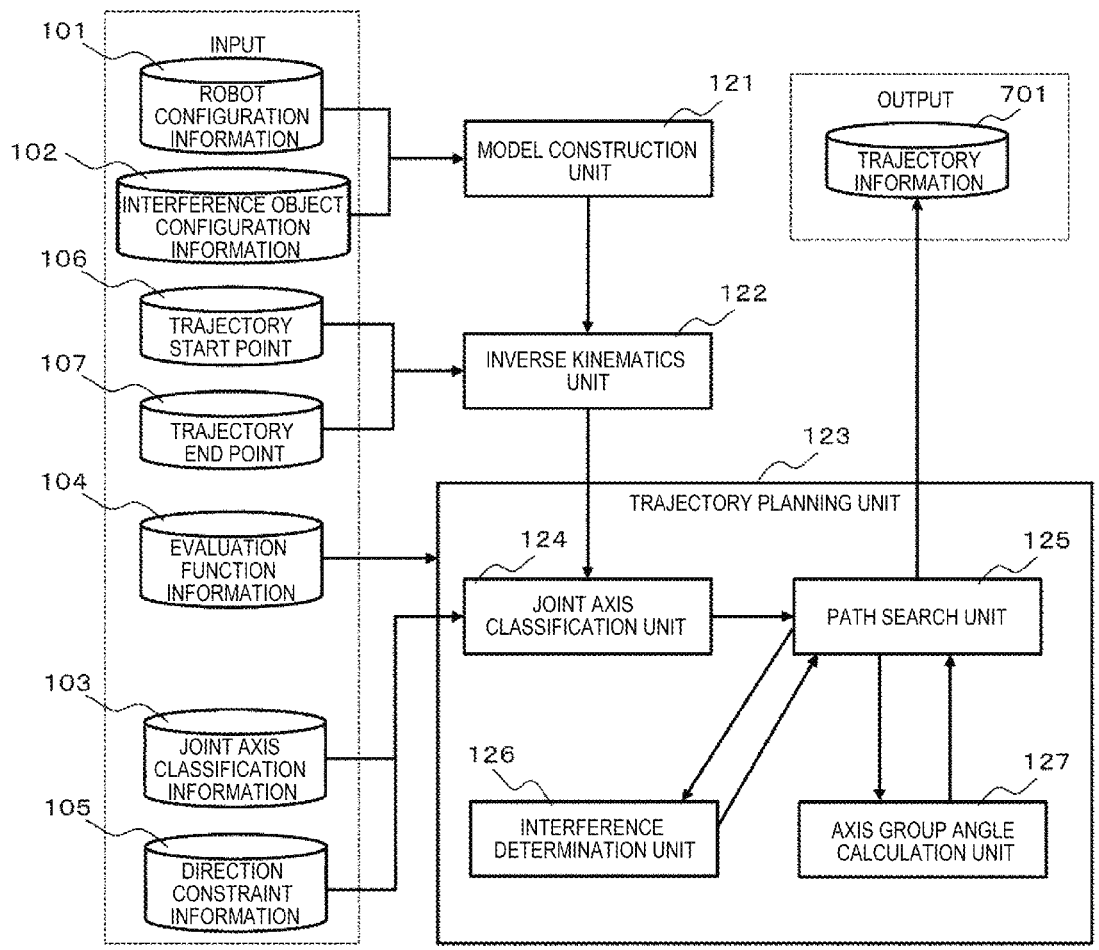
FIG. 5 is a diagram illustrating an example of the flow of processing and the input/output of information by the trajectory planning apparatus.

Next, FIG. 5 shows an example of the flow of processing and input and output of information by the trajectory planning apparatus 10.

The model construction unit 121 receives the robot configuration information 101 and the interference object configuration information 102 as an input, constructs the robot model and the interference object model, and outputs it to the inverse kinematics unit 122. The inverse kinematics unit 122 receives the robot model, the interference object model, the trajectory start point information 106, and the trajectory end point information 107 as an input, converts the data format of the trajectory start point information 106 and the trajectory end point information 107 into the angle of each joint, and outputs it to the joint axis classification unit 124.

The trajectory planning unit 123 receives the trajectory start point information 106 and the trajectory end point information 107 as an input after the conversion of the data format, generates a trajectory of the robot arm tip from the trajectory start point to the motion end point, and outputs it as the trajectory information 701. The processing by the trajectory planning unit 123 will be described below in detail with reference to FIGS. 8 and 9.

Figures 6, 7:
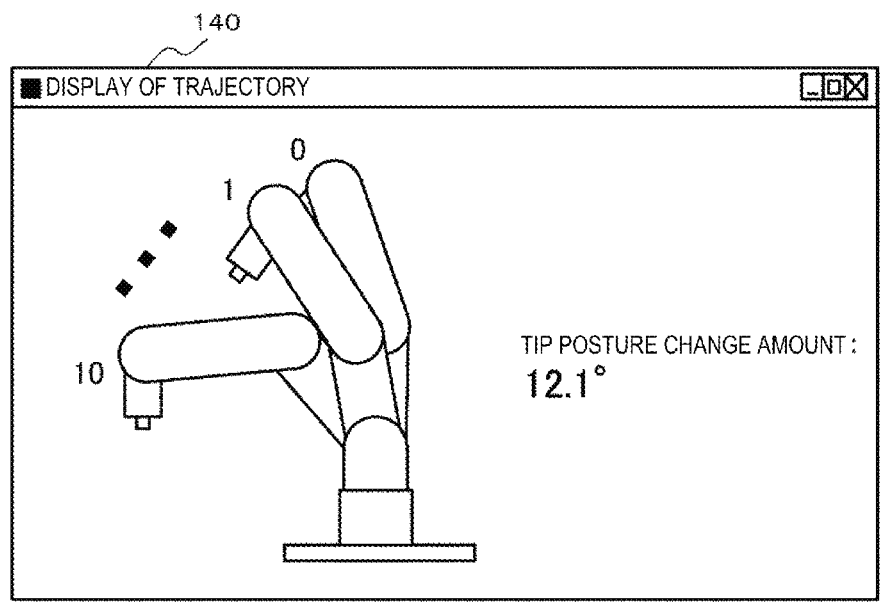
FIG. 6 is a diagram illustrating an example of trajectory information.
FIG. 7 is a diagram illustrating a display example of a trajectory display screen based on the trajectory information.

FIG. 6 illustrates an example of the trajectory information 701. In the trajectory information 701, the arrangement information of the robot posture representing the motion trajectory of the robot corresponding to the process number information of the motion trajectory is recorded. The process number information of the motion trajectory represents, for example, the chronological order of the robot's posture. The process number information may be omitted. The arrangement information of the robot posture is composed of, for example, the time to reach each posture and the joint angle of each joint axis.

FIG. 7 is illustrating a display example of a trajectory display screen 140 based on the trajectory information 701.

For example, the trajectory information 701 is output from the input/output unit 110 to the external device. The external device may display an animation representing the movement of the robot generated based on the trajectory information 701 on the trajectory display screen 140. By viewing the trajectory display screen 140, the user may confirm that the trajectory is planned to satisfy the constraints set by him/her. Further, it is possible to display the posture change amount of the robot arm tip on the trajectory display screen 140. Thus, the user may confirm that the robot arm tip has not moved more than necessary.

<Trajectory Planning Processing by Trajectory Planning Unit 123>

Figure 8:
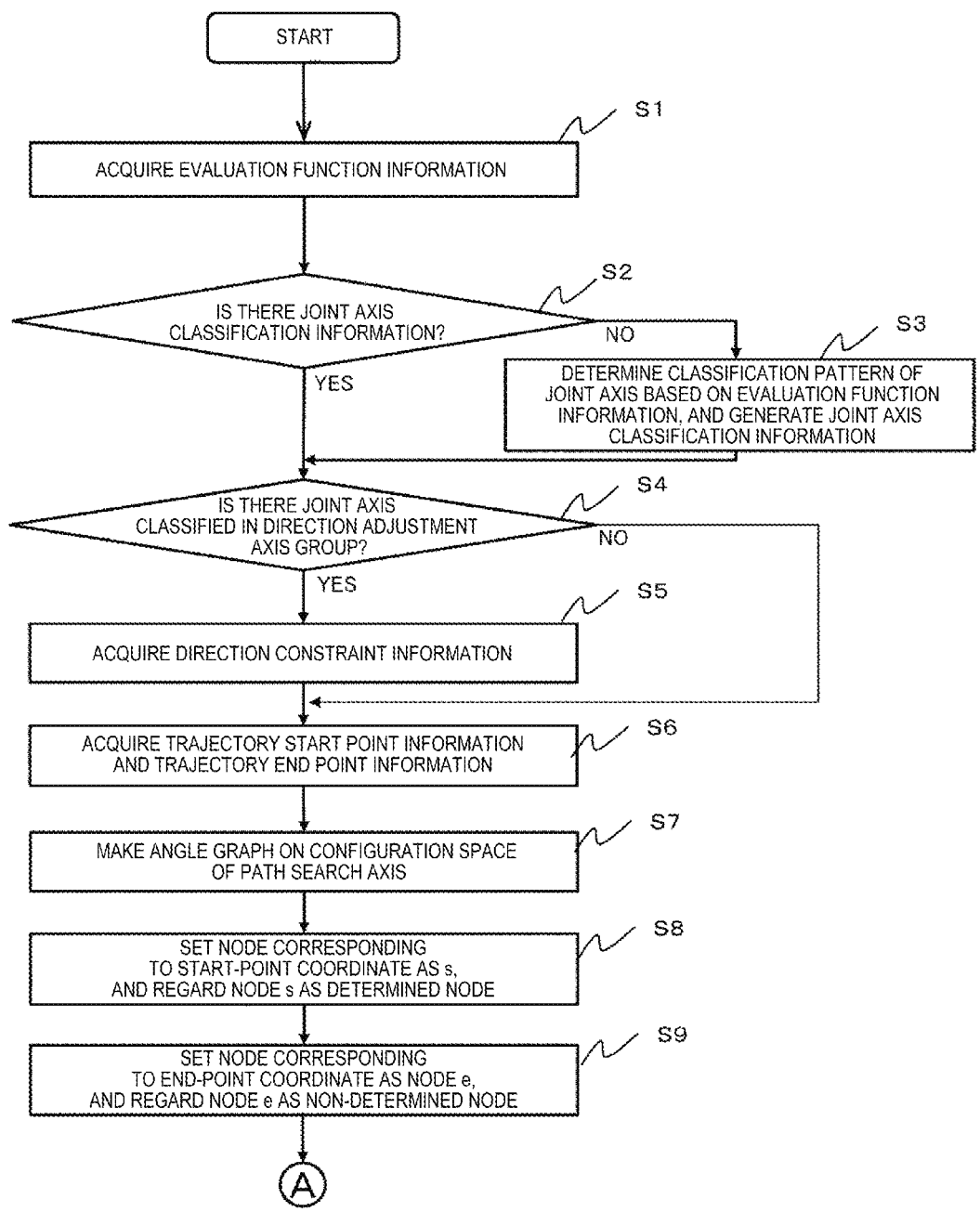
FIG. 8 is a flowchart illustrating an example of a trajectory planning process.
Figure 9:
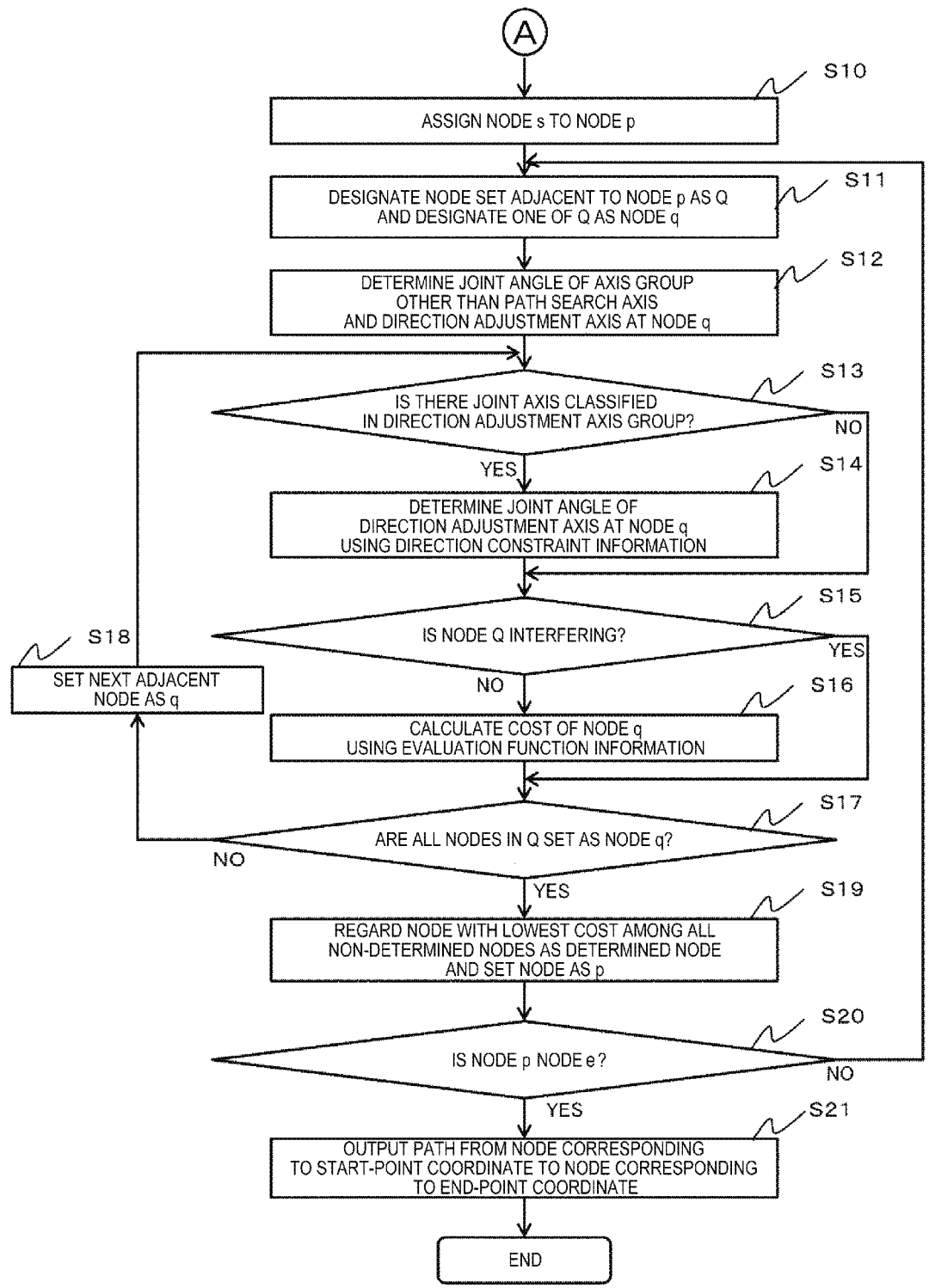
FIG. 9 is a flowchart illustrating an example of a trajectory planning process.

Next, FIGS. 8 and 9 are flowcharts illustrating an example of the trajectory planning process by the trajectory planning unit 123.

The trajectory planning process is started in response to a start command input from the user, for example.

First, the trajectory planning unit 123 acquires the evaluation function information 104 from the storage unit 100 (step S1). Instead of acquiring the evaluation function information 104 from the storage unit 100, the evaluation function information 104 input from the user via the input/output unit 110 may be acquired.

Next, the joint axis classification unit 124 of the trajectory planning unit 123 determines whether or not there is the joint axis classification information 103 in the storage unit 100 (step S2). Here, if it is determined that there is no joint axis classification information 103 (NO in step S2), the joint axis classification unit 124 classifies the plurality of joint axes of the robot into a plurality of different axis groups on the basis of the evaluation function information 104 acquired in step S1, generates the joint axis classification information 103 representing the classification result and stores it in the storage unit 100 (step S3).

In contrast, if the joint axis classification unit 124 determines that there is joint axis classification information 103 (YES in step S2), step S3 is skipped and the process proceeds to step S4. In this case, the joint axis classification unit 124 classifies the plurality of joint axes of the robot into a plurality of different axis groups according to the joint axis classification information 103. Further, in this case, since the joint axis classification information 103 that has been previously input by the user is adopted, it is possible to plan the trajectory that satisfies arbitrary functions and constraints in the later stage.

Next, the joint axis classification unit 124 refers to the joint axis classification information 103 and determines whether or not there is a joint axis classified as a direction adjustment axis group (hereinafter referred to as direction adjustment axis) (step S4). Here, if it is determined that there is the direction adjustment axis (YES in step S4), the joint axis classification unit 124 acquires the direction constraint information 105 from the storage unit 100 (step S5). Instead of acquiring the direction constraint information 105 from the storage unit 100, the direction constraint information 105 input from the user via the input/output unit 110 may be acquired. In contrast, if the joint axis classification unit 124 determines that there is no direction adjustment axis (NO in step S4), step S5 is skipped and the process proceeds to step S6.

Subsequently, the joint axis classification unit 124 acquires the trajectory start point information 106 and the trajectory end point information 107 after the format conversion of data input from the inverse kinematics unit 122 (step S6).

Next, the path search unit 125 refers to the joint axis classification information 103 of the storage unit 100, and generates a joint angle graph in which the angles of the respective path search axes are taken as nodes and edges connecting the angles of the adjacent path search axes are held in the configuration space of the path search axis with each joint angle as an axis. Further, the path search unit 125 sets all nodes of the generated nodal angle graph as non-determined nodes (step S7).

Next, the path search unit 125 generates the node s having the joint angle value of the path search axis of the trajectory start point on the joint angle graph generated in step S7 using the trajectory start point information 106 acquired in step S6, and connects the node s with one or more adjacent nodes at edges, respectively. Further, the path search unit 125 regards the node s as the determined node (step S8).

Next, the path search unit 125 generates the node e having the joint angle value of the path search axis of the trajectory endpoint on the joint angle graph generated in step S7 using the trajectory endpoint information 107 acquired in step S6, and connects the node e with one or more adjacent nodes at edges, respectively. Further, the node e is regarded as the non-determined node (step S9).

Next, referring to FIG. 9, the path search unit 125 assigns the node s to the node p (step S10). Next, the path search unit 125 designates the set of nodes adjacent to the node p as Q and designates one of the sets Q as the node q (step S11).

Next, the axis group angle calculation unit 127 determines the angle of each joint axis classified as an axis group other than the path search axis and the direction adjustment axis at the node q in accordance with a predetermined calculation rule preset for each axis group (step s12). For example, the axis group angle calculation unit 127 determines the angle of the joint axis classified as the stop axis group, as the angle at the motion start point. Further, for example, the axis group angle calculation unit 127 determines the angle of the joint axis classified as the linear interpolation axis group as a value for linearly interpolating the angle of the motion start point and the angle of the motion end point.

Next, similarly to the process of the joint axis classification unit 124 in step S4, the axis group angle calculation unit 127 refers to the joint axis classification information 103 and determines whether or not there is the direction adjustment axis (step S13). Here, when it is determined that there is the direction adjustment axis (YES in step S13), the axis group angle calculation unit 127 determines the joint angle of the direction adjustment axis at the node q according to the direction constraint information 105 (step S14).

For example, when the direction constraint information 105 is "linear interpolation between the start point and the end point", the axis group angle calculation unit 127 calculates a ratio of the joint angle value of the path search axis at the motion end point and the joint angle value of the path search axis at the node q to the joint angle value of the path search axis at the motion start point and the joint angle value of the path search axis at the node q, and a ratio of the direction of the robot arm tip at the motion end point and the direction of the robot arm tip at the node q to the direction of the robot arm tip at the motion start point and the direction of the robot arm tip at the node q. Further, the axis group angle calculation unit 127 determines the direction of the robot arm tip at the node q so that these ratios coincide with each other, and determined the joint angle of the direction adjustment axis at the node q using the inverse kinematics from the direction of the robot arm tip at the node q.

In contrast, when the axis group angle calculation unit 127 determines that there is no direction adjustment axis (NO in step S13), step S14 is skipped and the process proceeds to step S15.

Next, the interference determination unit 126 calculates the posture of the robot based on the joint angle of each path search axis assigned to the node q and each joint angle of the axis group other than the path search axis determined in step S12 and step S14. Further, the interference determination unit 126 determines whether or not the robot model and the interference object model interfere with each other in the calculated robot posture (step S15). Here, when the interference determination unit 126 determines that no interference occurs (NO in step S15), the path search unit 125 calculates a movement cost from the node p to the node q using the evaluation function acquired in step S1. Meanwhile, when the evaluation function is not acquired in step S1 (when the storage unit 100 does not store in advance and there is no direct input from the user), the movement cost is calculated using the "minimization of the change amount cost of the joint" as the evaluation function. Further, the path search unit 125 assigns the calculated movement cost to the edge connecting the node p with the node q (step S16).

In contrast, when the interference determination unit 126 determines that the robot model and the interference object model interfere with each other (YES in step S15), the path search unit 125 removes the node q from the joint angle graph and the process proceeds to step S17.

Next, the path search unit 125 determines whether or not all nodes included in the set Q are designated as the node q (step S17). Here, if it is determined that all nodes are not designated as the node q (NO in step S17), the path search unit 125 designates, as the node q, the node which is not yet the node q among all the nodes included in the set Q (step S18). Thereafter, the process returns to step S13, and steps S13 to S17 are repeated.

Subsequently, when the path search unit 125 determines that all nodes are designated as the node q (YES in step S17), the path search unit 125 regards a node having the smallest search cost by a path search algorithm such as a Dijkstra's method, among all non-determined nodes, as a determined node, and sets it to the node p (step S19).

Next, when the path search unit 125 determines whether the node p is the node e or not (step S20). When it is determined that the node p is not the node e (NO in step S20), the path search unit 125 returns the process to step S11 and repeats steps S11 to S20.

Subsequently, when it is determined that the node p is the node e (YES in step S20), the path search unit 125 searches for a cost minimum path from the node s to the node e by the Dijkstra's method or the like, generates the trajectory information 701 from the joint angle of each path search axis assigned to each node and the angle of each joint axis of the axis group other than the path search axis at each node determined at step S12, and outputs it to the input/output unit 110. The trajectory planning process by the trajectory planning unit 123 is completed.

According to the trajectory planning process described above, a plurality of joint axes are classified into two or more axis groups, and angle calculation is performed in all axis groups during the path search. Thus, for example, it is possible to plan the trajectory from the first teaching point to the second teaching point while avoiding the interference in real time with a calculation time of, for example, 0.1 to 1.0 second while satisfying constraints such as the direction constraint condition.

<Configuration Example of Production System According to Second Embodiment of the Invention>

Figure 10:
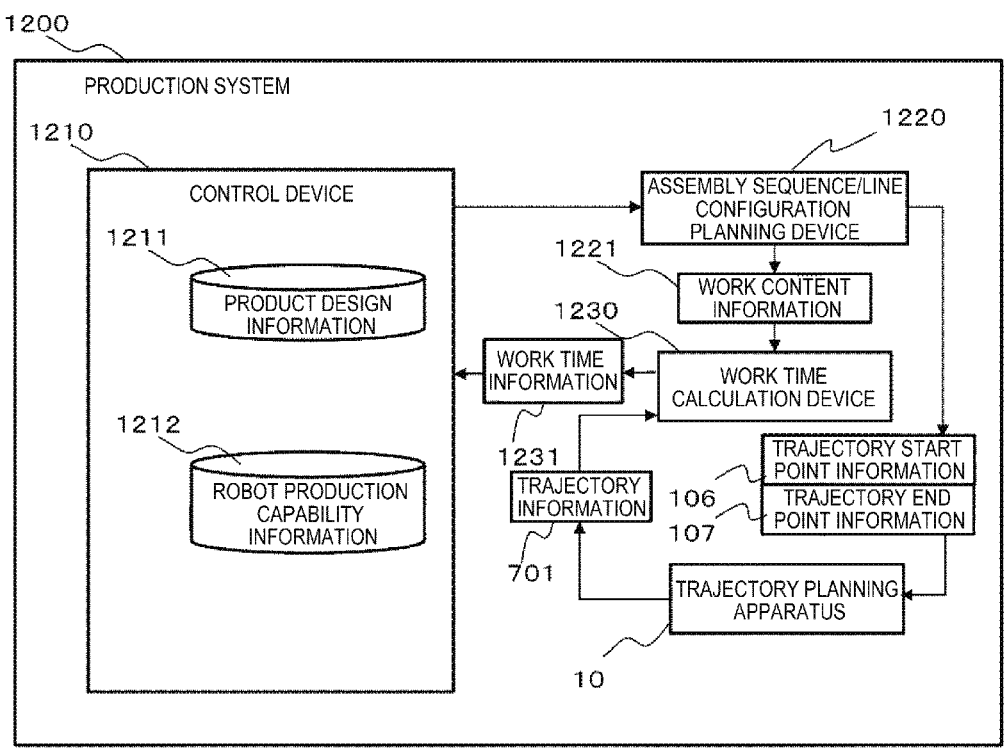
FIG. 10 is a diagram illustrating a configuration example of a production system according to a second embodiment of the invention.

FIG. 10 shows a configuration example of a production system according to a second embodiment of the invention.

The production system 1200 includes, in addition to the above-described trajectory planning apparatus 10, a control device 1210, an assembly sequence/line configuration planning device 1220, and a work time calculation device 1230.

The control device 1210 controls the entire production system 1200, and stores product design information 1211 and robot production capability information 1212 input from the user. The product design information 1211 includes, for example, information about the assembly of components required to assemble the product, such as CAD (Computer-Aided Design) data information of components included in the product, connection information of each component, or constraint information of each component. The robot production capability information 1212 includes constraint information and capability value information when the robot performs work, such as information on the loading weight of the robot, information on the work time required for the robot to assemble each component, and the like.

Based on the product design information 1211 and the robot production capability information 1212, the assembly sequence/line configuration planning device 1220 generates the trajectory start point information 106, the trajectory end point information 107 and the work content information 1221 by preparing the assembly sequence/line configuration plan of the product using one or more robots.

Here, the assembly sequence includes information representing the sequence of assembling respective components when assembling a product including a plurality of components. The line configuration plan includes work assignment information indicating which robot performs any work on any assembly line, and the like.

Further, the assembly sequence/line configuration planning device 1220 outputs the trajectory start point information 106 and the trajectory endpoint information 107 to the trajectory planning apparatus 10, and outputs work content information 1221 to work time calculation device 1230.

The work time calculation device 1230 receives the work content information 1221 output by the assembly sequence/line configuration planning device 1220 and the trajectory information 701 output by the trajectory planning apparatus 10 as input. By matching the process number information of each operation of the robot included in the work content information 1221 with the process number information of the operation trajectory included in the trajectory information 701, the information representing the work content of the robot included in the work content information 1221 is corresponded to the robot operation trajectory, and work time information 1231 in which the time required for each work is recorded using the time information included in the trajectory information 701 is generated.

Figure 11:
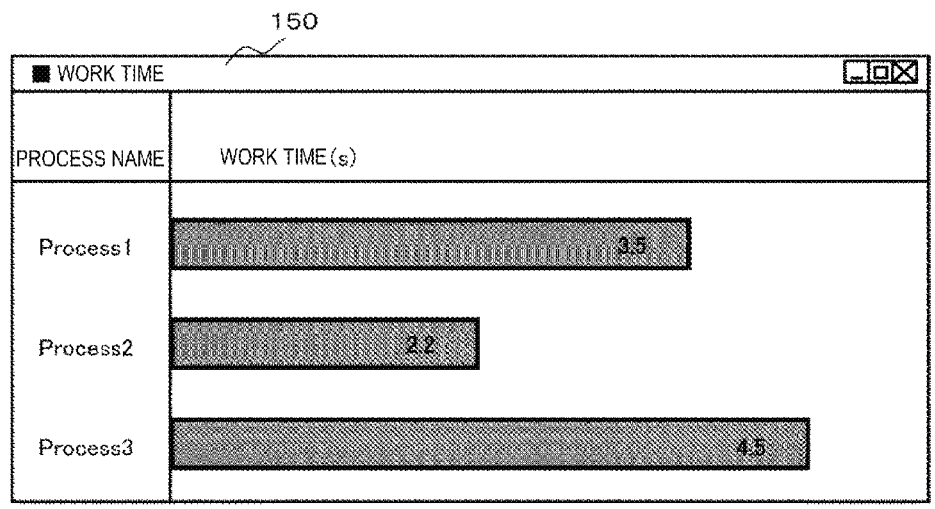
FIG. 11 is a diagram illustrating an example of work content information.

The work time calculation device 1230 may present the generated work time information 1231 to the user. FIG. 11 shows an example of a work time display screen for presenting the work time information 1231 to the user. On the work time display screen 150, the work time information of each process is displayed with a bar graph, and the length of work time is displayed to visually facilitate the understanding.

Next, FIG. 12 shows an example of the work content information 1221. The work content information 1221 represents a series of works performed by the robot, and the work content is recorded in association with the process numbers assigned to the respective operations performed by the robot.

<Example of Feedback Control Process by Production System 1200>

Figure 13:
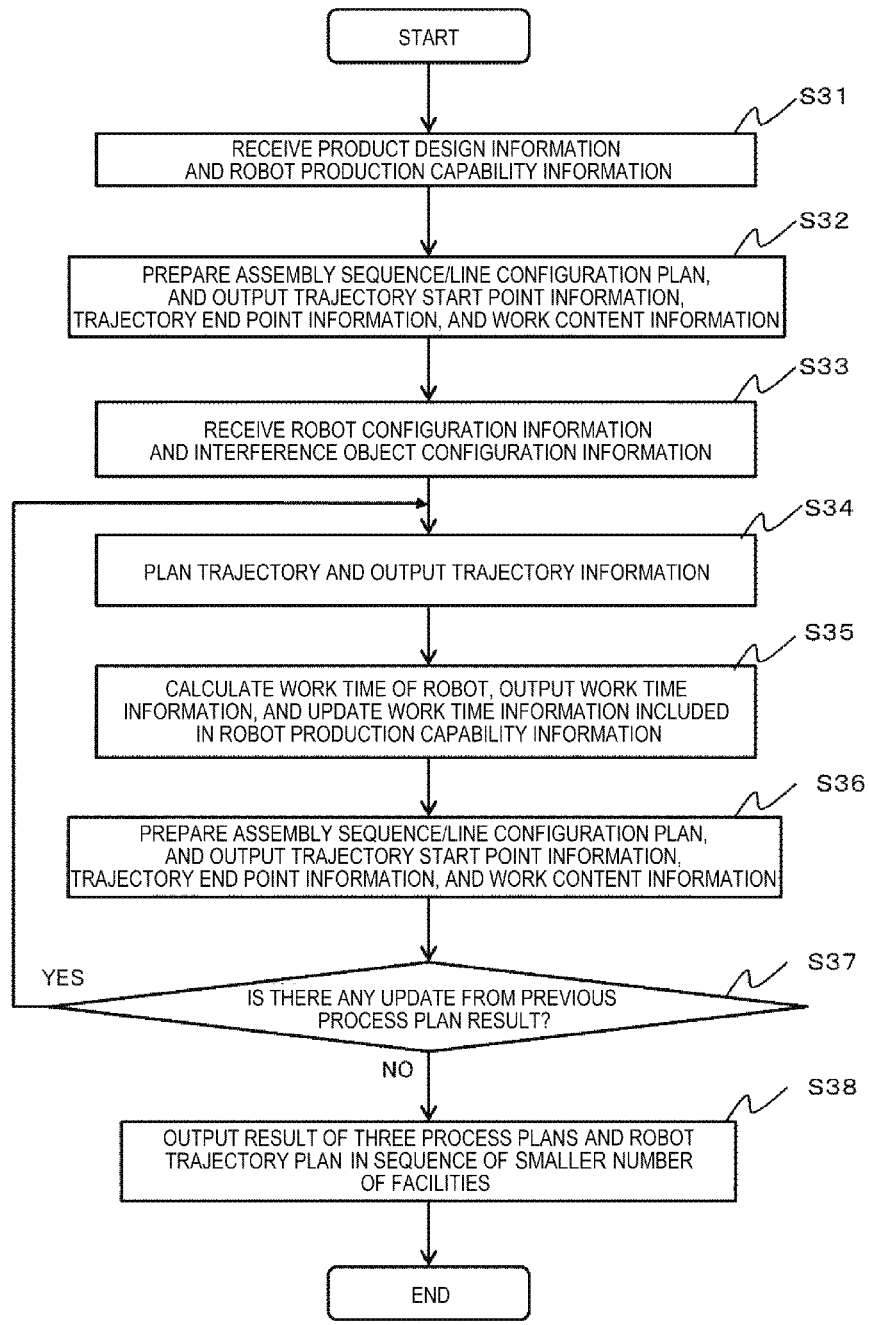
FIG. 13 is a diagram illustrating a display example of a work time display screen based on work time information.

FIG. 13 is a flowchart illustrating an example of a feedback control process by the production system 1200.

The feedback control process is started in response to a start command input from the user, for example.

First, the control device 1210 receives and stores product design information 1211 and robot production capability information 1212 input from the user (step S31).

Next, the assembly sequence/line configuration planning device 1220 acquires the product design information 1211 and the robot production capability information 1212 from the control device 1210 to prepare a product assembly sequence and a line configuration plan, generates the trajectory start point information 106, the trajectory end point information 107, and the work content information 1221 of each robot for the work process performed by one or more robots, outputs the trajectory start point information 106 and the trajectory end point information 107 to the trajectory planning apparatus 10, and outputs the work content information 1221 to the work time calculation device 1230 (step S32).

Next, the trajectory planning apparatus 10 receives the robot configuration information 101 and the interference object configuration information 102 input from the user (step S33). Subsequently, the trajectory planning apparatus 10 plans the trajectory of the robot arm based on the trajectory start point information 106, the trajectory endpoint information 107, the robot configuration information 101, and the interference object configuration information 102, and outputs the obtained trajectory information 701 to the work time calculation device 1230 (step S34).

Next, the work time calculation device 1230 causes the information representing the work content of the robot included in the work content information 1221 to correspond to the robot operation trajectory by matching the process number information of each operation of the robot included in the work content information 1221 with the process number information of the operation trajectory included in the trajectory information 701, for each robot, and generates the work time information 1231 in which the time required for each work is recorded using the time information included in the trajectory information 701, and outputs it to the control device 1210 (step S35). The control device 1210 updates the work time information included in the robot production capability information 1212, using the work time information 1231.

Next, the assembly sequence/line configuration planning device 1220 acquires the product design information 1211 and the robot production capability information 1212 after the update from the control device 1210, prepares the product assembly sequence and the line configuration plan, similarly to the processing of step S32, generates a plurality of pieces of trajectory start point information 106, trajectory end point information 107, and work content information 1221 of each robot for the work process performed by one or more robots, outputs the trajectory start point information 106 and the trajectory end point information 107 to the trajectory planning apparatus 10, and outputs the work content information 1221 to the work time calculation device 1230 (step S36).

Next, the control device 1210 determines whether the line configuration plan generated in the preceding step S36 is updated from the line configuration plan prepared in step S32 or step S36 before one cycle (step S37). When the control device 1210 determines that the line configuration plan is updated (YES in step S37), it is controlled such that the process returns to step S34 and steps S34 to S37 are repeated. Thus, the feedback of the trajectory information 701 and the work time information 1231 is repeated, and the line configuration plan is prepared each time.

Thereafter, when the control device 1210 determines that the line configuration plan is not updated (NO in step S37), the control device 1210 outputs a plurality of (e.g. three) line configuration plans and a plurality of robot trajectories as a plan in the sequence of the smaller number of robots to be used, for example, among the plurality of line configuration plans and robot trajectories planned during the repetition of steps S34 to S37 (step S38). Thus, the feedback control process by the production system 1200 is completed.

Figure 14:
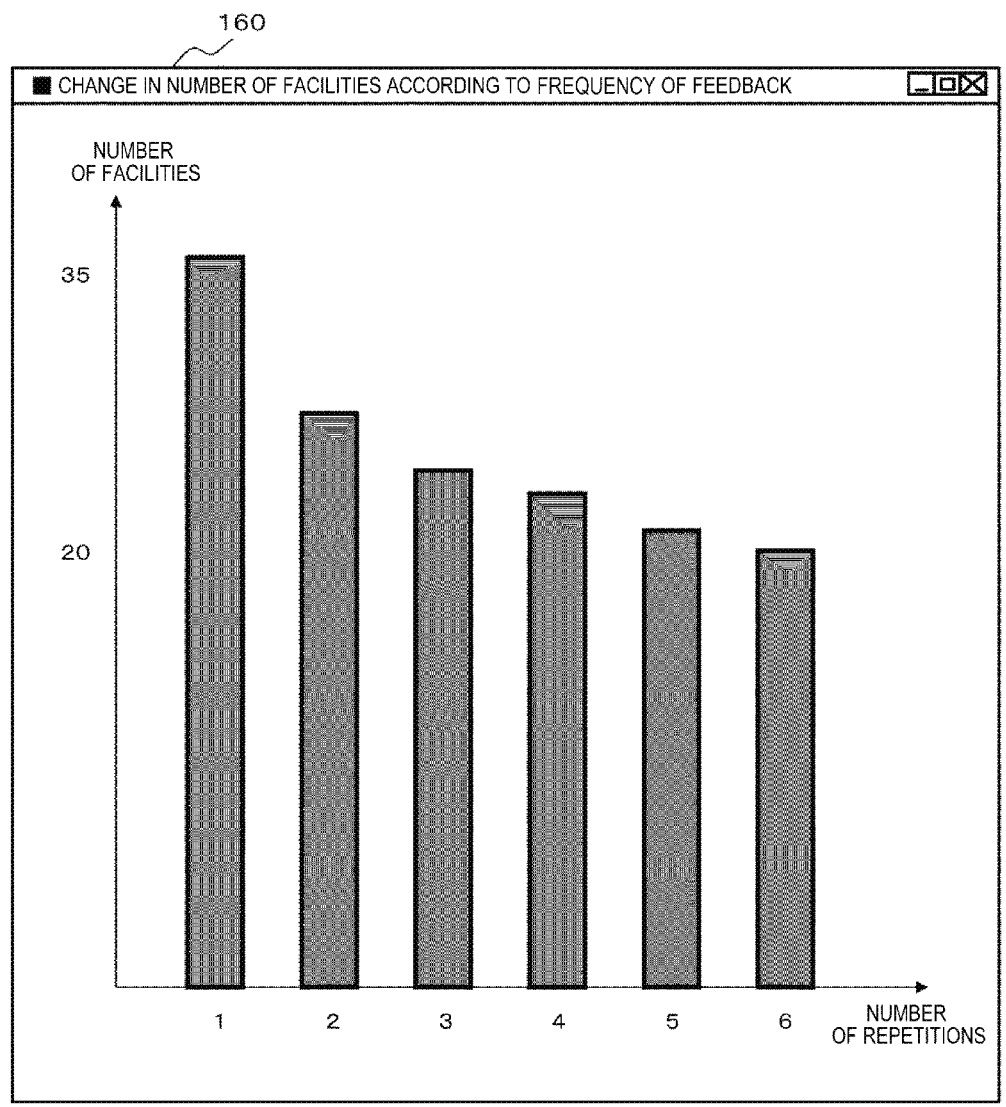
FIG. 14 is a diagram illustrating a display example of a screen showing a change in number of robots based on the number of times of feedback.

FIG. 14 shows a display example of the screen 160 showing a change in number of robots included in the line configuration plan by repeating the processing of steps S34 to S37 in the feedback control processing. As illustrated in FIG. 14, it may be seen that as the feedback is repeated, the number of robots required for manufacturing the product gradually decreases. It should be noted that the screen 160 may be updated and presented to the user each time feedback is performed.

According to the feedback control process described above, since the calculated work time is fed back to perform repeated trajectory planning and the like, it is possible to plan a highly accurate line configuration and to reduce the waste of the production cost due to the error of the assembly sequence/line configuration planning device 1220. Specifically, for example, it can be expected that the operation time of the robot is shortened, the number of robots is reduced, and the capital investment cost is reduced.

According to the feedback control process, since the trajectory planning apparatus 10 is used for the production system 1200, it is possible to suppress the prolongation of the time required for the trajectory plan, unlike the existing trajectory planning apparatus in which it is necessary to manually correct the trajectory or the feedback is not automatically repeated.

Further, according to the feedback control process, the user may efficiently produce the product using the robot, by selecting and adopting one of a plurality of output plans.

Meanwhile, the above-described trajectory planning apparatus 10, control device 1210, assembly sequence/line configuration planning device 1220, and work time calculation device 1230 may be configured by hardware or realized by software. When the trajectory planning apparatus 10 and the like are realized by the software, a program constituting the software is installed in the computer. Here, the computer includes a computer incorporated in dedicated hardware, and a general-purpose personal computer or the like capable of executing various functions by installing various programs, for example.

Figure 15:
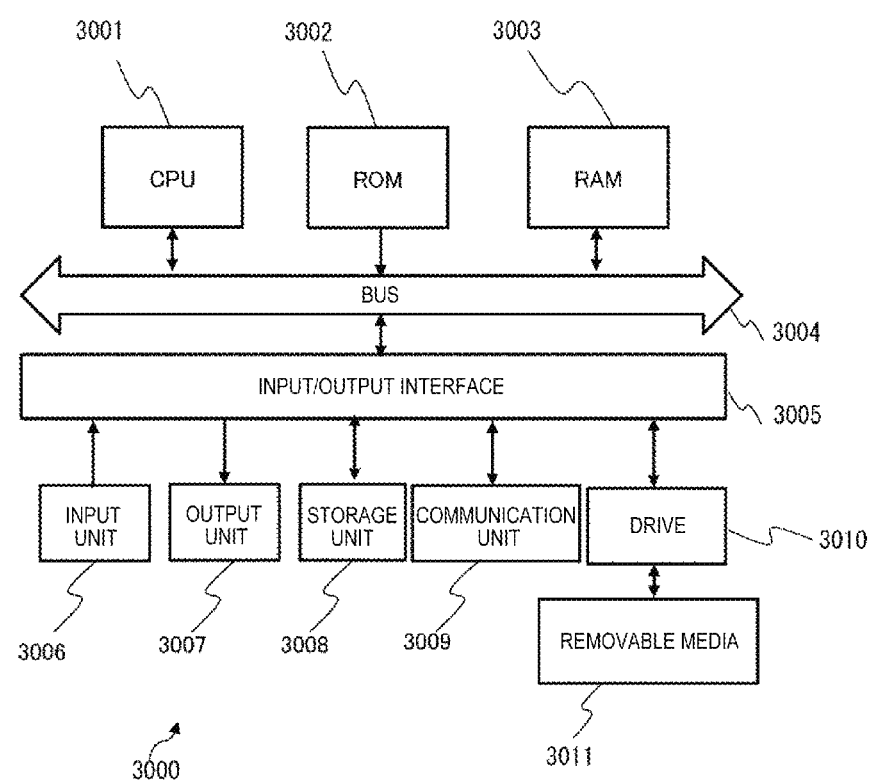
FIG. 15 is block diagram illustrating a configuration example of a computer.

FIG. 15 is a block diagram showing an example of the configuration of the hardware of the computer for realizing the trajectory planning apparatus 10 or the like by a program.

In the computer 3000, a CPU (Central Processing Unit) 3001, a ROM (Read Only Memory) 3002, and a RAM (Random Access Memory) 3003 are mutually connected by a bus 3004.

Further, an input/output interface 3005 is connected to the bus 3004. To the input/output interface 3005, an input unit 3006, an output unit 3007, a storage unit 3008, a communication unit 3009, and a drive 3010 are connected.

The input unit 3006 includes a keyboard, a mouse, a microphone, and the like. The output unit 3007 includes a display, a speaker, and the like. The input unit 3006 and the output unit 3007 correspond to the input/output unit 110 in the trajectory planning apparatus 10. The storage unit 3008 includes an HDD (Hard Disc Drive), an SSD (Solid State Drive) and the like, and stores various types of information. The storage unit 3008 corresponds to the storage unit 100 in the trajectory planning apparatus 10. The communication unit 3009 is composed of a LAN interface and the like, and communicates with other devices via the network. The drive 3010 drives a removable medium 3011 such as a magnetic disk, an optical disk, a magneto-optical disk, or a semiconductor memory.

In the computer 3000 configured as described above, for example, the CPU 3001 loads a program stored in the storage unit 3008 into the RAM 3003 via the input/output interface 3005 and the bus 3004 and then executes the program, thus realizing the trajectory planning apparatus 10 and the like.

A program to be executed by the computer 3000 (CPU 3001) may be recorded and provided in the removable medium 3011 as a package medium, for example. Further, the program may be provided via a wired or wireless transmission medium such as a local area network, a communication network, digital satellite broadcasting or the like.

In the computer 3000, the program may be installed in the storage unit 3008 via the input/output interface 3005 by attaching the removable medium 3011 to the drive 3010. Further, the program may be received by the communication unit 3009 via the wired or wireless transmission medium and installed in the storage unit 3008. In addition, the program may be installed in the ROM 3002 or the storage unit 3008 in advance.

The program executed by the computer 3000 may be a program in which processing is chronologically performed in accordance with the sequence described herein, or may be a program in which processing is performed in parallel or at necessary timing, for example, when a call is made.

The effects described herein are merely examples and are not limited. Thus, other effects may be provided.

The invention is not limited to the above-described embodiment, but includes various modified examples. For example, each of the above-described embodiments has been described in detail to make it easier to understand the invention, and the invention is not necessarily limited to one having all components described above. In addition, a part of the configuration of the embodiment may be replaced by the configuration of another embodiment, and the configuration of another embodiment may be added to the configuration of one embodiment. Further, it is possible to add, delete, or replace other configurations to, from, or with a part of the configuration of each embodiment.

Further, each of the above-described configurations, functions, processing units, processing means and the like may be realized with hardware, for example, by designing part or all of them with, for example, an integrated circuit. In addition, each of the above-described configurations, functions, and the like may be realized with software by interpreting and executing a program that realizes the respective functions by the processor. Programs, tables and files that realize each function may be stored in a memory, a storage device such as a hard disk or an SSD, or a recording medium such as an IC card, an SD card, a DVD, or the like. Further, control lines and information lines indicate those considered to be necessary for explanation, but do not necessarily indicate all control lines and information lines on the product. In practice, it may be considered that most of configurations are mutually connected.

The invention may be provided in various aspects such as not only a trajectory planning apparatus, a trajectory planning method, and a production system, but also a computer readable program and the like.

REFERENCE SIGNS LIST

10: trajectory planning apparatus
100: storage unit
101:• robot configuration information
102:• interference object configuration information
103:• joint axis classification information
104:• evaluation function information
105:• direction constraint information
106:• trajectory start point information
107:• trajectory end point information
110:• input/output unit
120:• processing unit
121:• model construction unit
122:• inverse kinematics unit
123:• trajectory planning unit
124:• joint axis classification unit
125:• path search unit
126:• interference determination unit
127:• axis group angle calculation unit
701:• trajectory information
1051:• constraint method selection information
1052:• arbitrary constraint designation information
1200:• production system
1210:• control device
1211:• product design information
1212:• robot production capability information 1220:• assembly sequence/line configuration planning device
1221:• work content information
1230:• work time calculation device
1231:• work time information
3000:• computer
3001:• CPU
3002:• ROM
3003:• RAM
3004:• bus
3005:• input/output interface
3006:• input unit
3007:• output unit
3008:• storage unit
3009: communication unit
3010:• drive
3011:• removable medium

The invention claimed is:

1. A trajectory planning apparatus, comprising:
a memory;
an input/output device; and
a processor communicatively coupled to the memory and the processor, wherein the processor is configured to:
classify a plurality of joint axes of a robot into a plurality of different axis groups, according to joint axis classification information for classifying into a plurality of different axis groups including at least a path search axis group;
generates a plurality of path search axes based on trajectory start point information representing a posture of the robot at a start point of the planned trajectory and trajectory end point information representing a posture of the robot at an end point of the planned trajectory, the plurality of path search axes include a plurality of nodes;
calculate an angle of the joint axis classified into each axis group other than a path search axis at the first adjacent node;
set a first node of the plurality of nodes, the first nodes corresponding to the start point, and a second node of the plurality of nodes corresponding to the end point;
associate the first node with at least one of a plurality of adjacent nodes of the plurality of nodes;
select as a first adjacent node, one of the at least one of the plurality of adjacent nodes;
determine, for each of the at least one of the plurality of adjacent nodes, an angle of a direction adjustment axis at the first adjacent node;
determine, for each of the at least one of the plurality of adjacent nodes, a cost for moving the first node to the first adjacent node;
select as a low cost node a node with a lowest cost, from each of the at least one of the plurality of adjacent nodes; and
compare the low cost node with the second node, and when the low cost node and the second node are the same, output a path between the first node and the second node based on the low cost node.

2. The trajectory planning apparatus according to claim 1, wherein
the processor calculates the angle of the joint axis classified as a direction adjustment axis group, based on direction constraint information about a tip of a robot arm.

3. The trajectory planning apparatus according to claim 2, wherein
the processor calculates the angle of the joint axis classified as the direction adjustment axis group by using inverse kinematics based on direction constraint information.

4. The trajectory planning apparatus according to claim 1, wherein the processor is further configured to
construct a robot model based on robot configuration information including at least information on the joint axis of the robot and three-dimensional model data representing a shape of the robot, and constructing an interference object model based on interference object configuration information including three-dimensional model data of the interference object and information indicating an installation position of the interference object;
determine whether or not the robot model interferes with the interference object model, and
determines the cost for moving the first node to the adjacent node for a path from only the at least one the plurality of adjacent nodes where the robot model does not interfere with the interference object model.

5. The trajectory planning apparatus according to claim 1, wherein
the processor classifies the plurality of joint axes into the plurality of different axis groups based on an evaluation function, when there is no joint axis classification information.

6. The trajectory planning apparatus according to claim 5, wherein
the processor refers to a table in which the evaluation function and a classification pattern of the joint axis correspond to each other when there is no joint axis classification information, and then classifies the plurality of joint axes into the plurality of different axis groups based on the evaluation function.

7. The trajectory planning apparatus according to claim 1, wherein the processor is further configured to
convert a position and a direction of the tip of the robot arm included in the trajectory start point information and the trajectory end point information into an angle of the joint axis of the robot.

8. The trajectory planning apparatus of claim 1, wherein
an evaluation function outputs at least one of a total change amount of all the joint axes of the robot, a movement amount of the tip of the robot arm, an operation time of the robot, an acceleration applied to the tip of the robot arm, and an inverse number of a distance between the robot and the interference object.

9. The trajectory planning apparatus according to claim 8, wherein
the memory stores evaluation function information including the evaluation function selected by a user, and
the processor searches for a path that minimizes the evaluation function represented by the evaluation function information.

10. The trajectory planning apparatus according to claim 9, wherein
when a plurality of evaluation functions are selected by the user, the processor searches for a path that minimizes a weighted sum of the plurality of selected evaluation functions.

11. A trajectory planning method using a trajectory planning apparatus, comprising:
a memory;
an input/output device; and a processor communicatively coupled to the memory and the processor, wherein the method includes:

classifying a plurality of joint axes of a robot into a plurality of different axis groups, according to joint axis classification information for classifying into a plurality of different axis groups including at least a path search axis group;

generates a plurality of path search axes based on trajectory start point information representing a posture of the robot at a start point of the planned trajectory and trajectory end point information representing a posture of the robot at an end point of the planned trajectory, the plurality of path search axes include a plurality of nodes;

calculating an angle of the joint axis classified into each axis group other than a path search axis at the first adjacent node;

set a first node of the plurality of nodes, the first nodes corresponding to the start point, and a second node of the plurality of nodes corresponding to the end point;

associating the first node with at least one of a plurality of adjacent nodes of the plurality of nodes;

selecting as a first adjacent node, one of the at least one of the plurality of adjacent nodes;

determining, for each of the at least one of the plurality of adjacent nodes, an angle of a direction adjustment axis at the first adjacent node;

determining, for each of the at least one of the plurality of adjacent nodes, a cost for moving the first node to the first adjacent node;

selecting as a low cost node a node with a lowest cost, from each of the at least one of the plurality of adjacent nodes; and comparing the low cost node with the second node, and when the low cost node and the second node are the same, output a path between the first node and the second node based on the low cost node.

12. A production system comprising:

an assembly sequence/line configuration planning device;
a trajectory planning apparatus; and
a work time calculation device, wherein
the assembly sequence/line configuration planning device prepares an assembly sequence of the product and a line configuration plan using a robot based on product design information including product design data and robot production capability information indicating a production capability of the robot, thus generating trajectory start point information, trajectory end point information, and work content information,
the trajectory planning apparatus includes:
a memory;
an input/output device; and
a processor communicatively coupled to the memory and the processor, wherein the processor is configured to:

classify a plurality of joint axes of the robot into a plurality of different axis groups, according to joint axis classification information for classifying into a plurality of different axis groups including at least a path search axis group;

generates a plurality of path search axes based on trajectory start point information representing a posture of the robot at a start point of the planned trajectory and trajectory end point information representing a posture of the robot at an end point of the planned trajectory, the plurality of path search axes include a plurality of nodes;

calculate an angle of the joint axis classified into each axis group other than a path search axis at the first adjacent node;

set a first node of the plurality of nodes, the first nodes corresponding to the start point, and a second node of the plurality of nodes corresponding to the end point;

associate the first node with at least one of a plurality of adjacent nodes of the plurality of nodes;

select as a first adjacent node, one of the at least one of the plurality of adjacent nodes;

determine, for each of the at least one of the plurality of adjacent nodes, an angle of a direction adjustment axis at the first adjacent node;

determine, for each of the at least one of the plurality of adjacent nodes, a cost for moving the first node to the first adjacent node;

select as a low cost node a node with a lowest cost, from each of the at least one of the plurality of adjacent nodes; and compare the low cost node with the second node, and when the low cost node and the second node are the same, and output trajectory information including a chronological angle of each joint axis of the robot and representing a trajectory connecting the first node and the second node based on the low cost node, the work time calculation device calculates the work time of the robot based on the work content information and the trajectory information, and the work time of the robot calculated by the work time calculation device is fed back to the assembly sequence/line configuration planning device as the robot production capability information.

* * * * *